United States Patent [19]
Leeds

[11] 3,951,528
[45] Apr. 20, 1976

[54] METHOD OF MAKING POLYMERIC CONTACT LENS

[75] Inventor: Harry R. Leeds, Rochester, N.Y.

[73] Assignee: Patent Structures, Inc., New York, N.Y.

[22] Filed: July 23, 1975

[21] Appl. No.: 598,405

Related U.S. Application Data

[60] Continuation of Ser. No. 149,784, June 2, 1971, abandoned, which is a division of Ser. No. 713,998, March 18, 1968, abandoned.

[52] U.S. Cl. ............................. 351/177; 351/160; 264/1; 526/73; 526/200; 526/213; 526/320
[51] Int. Cl.² .................... G02C 7/04; G02B 1/04
[58] Field of Search ................ 351/177, 160; 264/1; 260/89.5 A, 86.1 E

[56] References Cited
UNITED STATES PATENTS

| | | | |
|---|---|---|---|
| 3,361,858 | 1/1968 | Wichterle | 351/160 X |
| 3,496,254 | 2/1970 | Wichterle | 351/160 X |
| 3,503,942 | 3/1970 | Seiderman | 351/160 X |
| 3,520,949 | 7/1970 | Shepherd et al. | 351/160 X |
| 3,660,545 | 5/1972 | Wichterle | 351/160 X |

*Primary Examiner*—David H. Rubin
*Attorney, Agent, or Firm*—Cushman, Darby & Cushman

[57] ABSTRACT

The present application discloses a polymeric plastic material suitable for contact lenses. It is made from a monomer having the formula

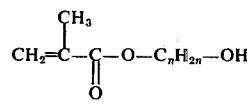

wherein $n$ is 2 or 3, in the substantial absence of diunsaturated and polyunsaturated monomers. The mixture subjected to polymerization may also contain as an additional comonomer a compound having the formula

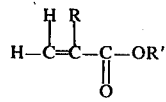

wherein R is hydrogen or $CH_3$, and R' is a lower alkyl group, or a group $(C_2H_4O)_mH$ where m is an integer of at least 1. The application also discloses a post-heating or post-curing step, the machining of the plastic into contact lenses followed by washing in dilute alkali to neutralize any residual acid material within the plastic, followed in turn by heating in normal saline or isotonic solution to make the lens compatible with the eyeball.

10 Claims, No Drawings

METHOD OF MAKING POLYMERIC CONTACT LENS

This is a continuation of application Serial No. 149,784 filed June 2, 1971, which is a division of Serial No. 713,998 filed March 18, 1968, both now abandoned.

Contact lenses ordinarily have a marked tendency to cause partial asphyxiation of the metabolism of the cornea of the eye. This is true for the corneal, as well as the scleral type, even though the former are somewhat smaller and cover only the cornea. Such asphyxiation in turn causes irritation of the cornea and has given rise to a significant problem in the use of contact lenses for many individuals.

Contact lenses have conventionally been fabricated of relatively hard plastic materials. The very hardness of the material itself has also caused problems in the use of contact lenses because it has required a "break in" period varying in length of time with the particular individual. Some people whose corneas have not been readily adaptable to the contact lens have required very long periods of "break in" and in some cases have not been able to adapt themselves at all to corneal contact lenses because of this problem.

On the other hand, attempts to make a softer contact lens have not been entirely satisfactory because softer material usually has also been more fragile and is more readily scratched or broken when subjected to normal usage.

Conventional contact lenses have tended to inhibit the normal metabolism of the cornea by interfering with the flow of liquids to and from the surface of the eyeball and by interfering with the release of carbon dioxide from the surface of the cornea and the supply of oxygen to such surface. When the oxygen supplied to the cornea is reduced for a long period of time as by continuous wearing of conventional contact lenses, the cornea may become edemous thereby adversely affecting its transparency and efficiency. Moreover, the interference with the flow of fluids outwardly and/or inwardly may cause the epithilium to wrinkle or form craters, and may cause gas bubbles to collect under the lens, either or both of which, of course, would impede vision.

In many cases, of course, on the other hand, it is highly desirable for the wearer to be able to maintain his contact lenses in place for long periods of time. Accordingly, it would be very desirable to have a contact lens material which would combine all of the attributes of softness (thereby avoiding abrasion of the surface of the cornea) good optical qualities such as clarity and integrity, and ability to transmit liquids and gases. It also should withstand scratching, tearing, etc. in normal usage and should be machinable in order to be made in the form of a contact lens. Molding, of course, can be used to simplify some of the steps of the formation of the lens shape, but in most instances it is desirable to machine at least the outer edges of the lens in order that it may be tapered so as to resist movement on the cornea which otherwise might be caused by movement of the eye lids.

Important criteria for contact lens material include therefore:

1. Optical properties. This includes clarity and integrity which means the ability of the lens to replicate its shape and continuity of surface from the unhydrated state to the hydrated state without distortion. Vision and acuity should remain constant. The lens should not change its shape or position on the eye.

2. Ability to transmit fluids. This should include both any fluids exuded from the surface of the eye and the transmission of tears from the outer surface inwardly toward the eyeball surface. Drying of the outside surface of the lens tends to cause fogging, thereby impairing vision.

3. Machinability. This includes ability to be fabricated and polished. As noted elsewhere in the present specification, although the lens may be molded, it is preferred to machine the edges so that they taper and thereby have minimal tendency to change their position on the eye when the eye lids are moved.

4. Physical durability. The lens should withstand scratching, tearing or splitting in the normal usage and preferably even in abnormal usage.

Accordingly, an object of the present invention is to prepare such a plastic or polymeric material for use in contact lenses, and to prepare contact lenses from such material. Other objects and advantages of the invention will appear from the following description.

In accordance with the present invention, plastic polymeric material suitable for contact lenses is made by reacting under polymerization conditions a monomer having the formula

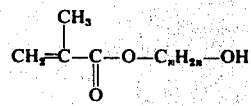

wherein $n$ is 2 or 3 in the substantial absence of diunsaturated and polyunsaturated monomers. The polymerization is continued until it is substantially complete and until the polymeric material formed is water-insoluble.

A catalyst or polymerization initiator is added in a small amount. These materials are well known in the field and include those, such as di-secondary butyl peroxy dicarbonate, or benzoyl peroxide or similar types of catalysts or initiators. The di-secondary butyl peroxy dicarbonate which is sold under the trademark Lupersol 225 is preferred because it brings about the desired reaction when used in very small amounts and produces a highly desirable product. Other suitable catalysts include ditertiary butyl peroxide, di-isopropyl peroxydicarbonate and azoisobutyronitrile.

The polymerization is carried out under normal polymerization temperatures, suitably about 45° to about 65°C. Preferably subsequent to the initial polymerization step, the polymer is heated at a somewhat higher temperature of about 90° to about 110°C to bring about the polymerization of any unpolymerized material which may be present, or to complete the polymerization of potentially polymerizable material.

The monomer which has been found to produce especially desirable plastics for contact lenses is hydroxyethyl methacrylate.

In accordance with further embodiments of the invention, a second monomer is mixed with and polymerized with the first named monomer to form a copolymer. The formula of the second formula is

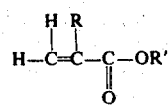

wherein R is hydrogen or CH₃ and R' is a lower alkyl group, or a group $(C_2H_4O)_mH$ where $m$ is an integer of at least 1.

The preferred second monomer is the normal propyl methacrylate. Ethyl methacrylate is less soluble in HEMA and therefore not as readily usable in the amounts desired. It has been found that the incorporation of the second monomer in small amounts into the mixture to be polymerized improves the resistance of the polymer to scratching, tearing, abrasion, etc. in normal use without any appreciable decrease in the other criteria set forth above for contact lens material.

These second comonomers are added in the amount of about 1 to about 15 parts to 100 parts of the first monomer. Below about 1 part, significant improvement in the durability of the material may not be observed, whereas above about 15 parts, the plastic material may be too soft. The preferred amount of the second monomer is about 3 to about 8 parts per 100 parts of the first monomer.

The monomer will be substantially completely polymerized under the polymerization conditions described. In order to insure, however, that no significant amount of monomer remains unpolymerized, it will ordinarily be preferred to subject the polymer to a post-curing or post-heating step. This step also serves the purpose of relieving any internal strains that may exist within the polymer. It is removed from the receptacle in which the initial polymerization is carried out and placed upon an aluminum foil sheet or similar support and inserted into an oven at a temperature of about 100°C or suitably within the range of about 90° to about 110°C. It may be allowed to remain in the post-curing oven for about 10 hrs. although a shorter period of time may suffice and a longer period of time will do no particular harm.

After the polymerization is substantially complete, the polymeric plastic material is ready to be cut or machined into the form of the final contact lens. It is feasible, of course, to mold the lens in substantially its final shape. Machining, grinding and/or casting is done in a manner known per se in order to obtain a lens having a surface suitable for its optical function. As indicated previously it is preferred to machine the outer edges of the lens to a tapered shape so that they are more compatible with the eyeball and permit the lens to retain its position on the cornea without being displaced by movement of the eye lids.

In forming the lens, allowance is made for the fact that upon hydration it will expand to a considerable extent. The lens, for instance, made in accordance with the Examples will expand about 30% indicating a porosity (microporisity) of about 30%. This may vary somewhat more or less depending upon the composition of the monomer mixture. It is predictable and constant, however, and accordingly appropriate allowance is made for the amount of expansion in accordance with known techniques depending upon what the particular degree of expansion is.

It is important for the purpose of the present invention to treat the lens to remove from its interstices any acidic condition which may be present there, otherwise acidic material migrating from the lens may irritate the eyeball. Accordingly, the lens material is washed in a dilute alkali, suitably at a pH of about 9 – 10 to neutralize such acid condition.

After the neutralization step, it is then desirable to place the lens in a condition in which it is compatible with the surface of the eye. It is, therefore, treated in a normal saline or isotonic solution, this may be done by boiling the lens in normal saline or isotonic solution for a short period of time.

Although the alkyl methacrylates are the preferred additives to the hydroxy alkyl methacrylates for the purpose of the present invention, it is possible also to incorporate small amounts of other additives to improve the machinability of the polymerized plastic material. It is important, however, to avoid the use of excessive amounts of such other additives because such excessive amounts tend to cause a loss in optical properties, strength, resistance to abrasion, scratching, tearing, etc. which the preferred material has. Such additives include, for example, cellulose acetate, (Eastman Kodak's E-398-10) in the amount, for example, of about 2 parts by weight per 90 parts HEMA.

It is significant also that water itself tends to soften or plasticize the material. Hence, instead of using one of the additives just mentioned, which may be incorporated for the purpose of rendering the material more machinable, one may merely introduce a small amount of water into the polymer as, for example, by maintaining the polymer in an environment having the proper humidity. Higher relative humidities ordinarily encountered in the atmosphere will, for example, effect appreciable softening of the polymer.

The following examples are to illustrate the invention.

EXAMPLE 1

90 parts by weight of hydroxyethyl methacrylate (HEMA), containing a small amount 1–2% by weight of methacrylic acid, are mixed with 4 parts polyethylene glycol (Carbowax 200, a trademark of Carbide and Carbon Chemicals Corp.) and about 0.5 parts peroxide catalyst, which in this instance is Lupersol 225 (di-secondary butyl dicarbonate). The liquid mixture is poured into a standard size polyethylene tube having an inside diameter of ½ inch, the lower end of the tube being closed by a silicone rubber stopper. The polyethylene tube is inserted into a standard size ¾ inch acrylonitrile-butadienestyrene pipe for the purpose of supporting the polyethylene tube. The upper end of the polyethylene tube is closed with another stopper for the purpose of excluding foreign matter. The polyethylene tube containing the mixture described above is then inserted into an oven and maintained at a temperature of 50°C for 2 hours. The time of treatment in the oven may be extended to 3 to 4 hours to make certain that the polymerization has taken place to the desired extent and a solid rod has been produced. The polymerized mass is then removed from the oven, the polyethylene tube removed from the supporting pipe, and the polyethylene is slit and stripped off of the polymerized HEMA contained therein. The polymerized HEMA is then placed on a supporting aluminum foil sheet and inserted into another oven and maintained at a temperature of 100°C and post-cured for about 10 hours. The post-curing is carried out principally to make certain that polymerization is complete and in some cases may not be necessary. Another function of the post-curing is to release any internal stresses which may have been built into the polymer during the initial polymerization step. The polymerized HEMA is next cut and machined to the desired shape of a contact lens having the usual convex shape and preferably tapered edges to minimize any tendency toward irritation by movement of the eyelid. The outside diameter of the lens is about 0.420 inch.

In designing the configuration and dimension of the lens as machined in the dry state, consideration and allowance is made to the fact that upon wetting and hydration the lens will expand about 32%. After machining, the lens is immersed in a dilute alkaline solution, suitably sodium bicarbonate having a pH of about 9–10. It is held in the sodium bicarbonate solution at about 85°C. for 15 minutes. By this time the lens has become completely hydrated and any acid condition which existed in the lens has been neutralized. The lens is next removed from the sodium bicarbonate and inserted into a boiling normal or isotonic saline solution (about 0.9% sodium chloride). In this way the excess alkali retained in the lens from the alkaline solution is replaced with normal saline and the lens is completely compatible with the fluids in the eye. By using the saline instead of water for the post-treatment, undue expansion which would be caused by ordinary water is avoided and the lens assumes the desired size and configuration. Such expansion would be caused by the osmotic pressure exerted by the salt within the lens, as compared with the much lower concentration in the water surrounding the lens.

When using the lens, it is also important that the lens has been previously saturated with isotonic or normal saline solution in order to provide the compatibility with the eye fluids, so that the lens does not destroy the tear layer and can position itself properly in the center of the eye.

The lens prepared by this example has excellent optical properties including clarity, integrity of form and surface characteristics, and freedom from distortion. The index of refraction of the material is also very suitable for a contact lens. The vision and acuity remain constant. There is no significant change in shape or tendency for the lens to change its position on the eye. The lens also has the ability to transmit fluids from the surface of the eyeball outwardly, or inwardly toward the eyeball. The polymer made by the procedure of this example also has excellent machinability and ability to be polished. As noted above, this is important from the standpoint of the need to taper the edges of the lens by machining to impart adaptability to the movement of the eyelids. The lenses made in accordance with this procedure also withstand and resist scratching and tearing in normal usage.

EXAMPLE 2

90 parts by weight of hydroxyethyl methacrylate (HEMA) are mixed with 10 parts 2-hydroxyethyl acetate and 0.02 parts Lupersol 225 and inserted into a polyethylene tube similar to that described in Example 1. The mixture is polymerized at 45°C – 55°C for 3 hours. The product is suitable for contact lens material and has essentially the characteristics of the polymer prepared according to Example 1.

EXAMPLE 3

90 parts by weight of HEMA and 5 parts 2-hydroxyethyl acetate are mixed with 0.02 parts Lupersol 225 and inserted into a polyethylene tube of the same type as described in Example 1 and heated at 45°–55°C for 3.5 hours. The polymer obtained has essentially the same characteristics as is suitable as contact lens material as the polymer prepared according to Example 1.

EXAMPLE 4

80 parts by weight of HEMA are mixed with 10 parts 2-hydroxyethyl acrylate and 0.02 parts Lupersol 225 in a polyethylene tube of the same type as described in Example 1 and are heated under polymerizing conditions at 50°C for 3 hours. The polymer obtained is again suitable as a contact lens material and has essentially the same characteristics as described in Example 1.

EXAMPLE 5

80 parts by weight of HEMA are mixed with 10 parts hydroxypropyl acrylate and 0.02 parts Lupersol 225. The mixture is inserted into a polyethylene tube as described in Example 1 and heated under polymerizing conditions at 45°C–55°C for 2.5 hours. The polymer obtained is essentially similar to that obtained according to Example 1 and is suitable as a contact lens material.

EXAMPLE 6

80 parts by weight of HEMA are mixed with 5 parts 2-hydroxyethyl acrylate and 0.02 parts Lupersol 225 and are inserted into a polyethylene tube of the same type as described in Example 1 and heated under polymerizing conditions at 45°C–55°C for 3 hours. The polymer obtained is essentially similar to that described in Example 1 and is suitable as a contact lens material.

In each of the foregoing Examples 2–6, inclusive, the polymer may be post-cured as described in Example 1 to be certain that the material is substantially completely polymerized.

EXAMPLE 7

90 parts by weight of hydroxypropyl methacrylate is mixed with 4 parts polyethylene glycol (Carbowax 200) and 0.5 parts Lupersol 225. The liquid mixture is poured into the polyethylene tube of the same type as described in Example 1 and heated in an oven at 50°C for 2 hours. The polymerized material is then removed from the oven, the polyethylene tube is slit and stripped off of the polymer contained therein. The polymer is then placed on a supporting aluminum foil sheet and inserted into another oven and maintained at a temperature of 100°C. and post-cured for 10 hours. The polymer is next cut and machined to the desired shape of a contact lens having the usual convex shape and preferably tapered edges as described in Example 1. After machining, the lens is immersed in a dilute alkaline solution, suitably sodium bicarbonate, having a pH of about 9–10 and held in the sodium bicarbonate solution at about 85°C for 15 minutes. By this time the lens has become completely hydrated and any acid condition which existed in the lens has been neutralized. The lens is next removed from the sodium bicarbonate solution and inserted into a boiling normal or isotonic saline solution (about 0.9% sodium chloride). In this way the excess alkali retained in the lens from the alkaline solution is replaced with normal saline as in Example 1 and the lens is completely compatible with the fluids in the eye. The lens prepared according to this Example has satisfactory optical properties including clarity and integrity of form and surface characteristics and freedom from distortion. The index of refraction of the material is also very suitable for a contact lens. The vision and acuity remain constant. There is no significant change in shape or tendency for the lens to change its position on the eye. The lens also has the ability to transmit fluids from the surface of the eyeball outwardly, or inwardly toward the eyeball. The polymer made by the procedure of this Example also has excellent machinability and ability to be polished. The lenses also withstand scratching and tearing in normal usage.

EXAMPLE 8

90 parts by weight of HEMA (containing a small amount 1-2% by weight of methacrylic acid), 5 parts n-propyl methacrylate and 0.02 parts Lupersol 225 are mixed and inserted into a polyethylene tube as described in Example 1. The initial polymerization is carried out in an oven at a temperature of 50°C for 2 hours. The polymer is then removed from the oven, the polyethylene tube slit and stripped off of the polymerized HEMA contained therein, and the latter is placed on a supporting aluminum foil sheet and post-cured at 100°C for about 10 hours as described in Example 1. The polymerized HEMA is cut and machined to the desired shape of contact lenses having an outside diameter of about 0.420 inch. After machining, the lens is immersed in a dilute alkaline solution suitably sodium bicarbonate having a pH of about 9-10. It is held in the sodium bicarbonate solution at about 85°C for 15 minutes. By this time the lens has become completely hydrated and any acid condition which existed in the lens has been neutralized. The lens is next removed from the sodium bicarbonate and inserted into a boiling normal or isotonic saline solution. In this way the excess alkali retained in the lens from the alkaline solution is replaced with normal saline and the lens is completely compatible with the fluids in the eye. The lens prepared by this Example has excellent optical properties including clarity and integrity of the surface. Its visual acuity remains constant and it tends to maintain its position on the cornea of the eye without change in shape or position. Moreover, it has the ability to transmit fluids both inwardly and outwardly and to transmit gases such as carbon dioxide liberated by normal metabolic processes from the surface of the eye. It also has excellent machinability and ability to be polished. It is particularly unique in its resistance to scratching, tearing, maintaining its strength, etc. in normal usage.

In Examples 9 to 12, inclusive, various amounts of ethyl methacrylate, methyl methacrylate, n-propyl methacrylate and n-butyl methacrylate were copolymerized with HEMA using Lupersol 225 as the catalyst to prepare polymers which were machined and were suitable for contact lenses. The relative proportions of materials are set forth in the following table:

|  | Ex. 9 | Ex. 10 | Ex. 11 | Ex. 12 |
|---|---|---|---|---|
| HEMA (parts by weight) | 90 | 90 | 90 | 90 |
| Co-monomer | ethyl | methyl | n-propyl | n-butyl |
| (parts by weight) | 1 | 5 | 5 | 5 |
| Lupersol 225 (parts by weight) | 0.02 | 0.02 | 0.02 | 0.02 |

EXAMPLE 13

90 parts by weight of HEMA are mixed with 5 parts diethylene glycol methacrylate and 0.02 parts Lupersol 225 and are polymerized in the same manner as described in Example 1. The polymer obtained is essentially similar to that described in Example 1 and is suitable as a contact lens material, although the strength of the lens is not as great as the material obtained in accordance with Example 8.

EXAMPLE 14

90 parts by weight of HEMA are mixed with 5 parts triethylene glycol methacrylate and 0.02 parts Lupersol 225 and are polymerized as described in Example 1. The polymer again is essentially similar to that obtained in accordance with Example 1 and is suitable as a contact lens material. The strength of the lens, however, is not as great as that of the material obtained in accordance with Example 8.

EXAMPLE 15

90 parts by weight of HEMA are mixed with 5 parts tetraethylene glycol methacrylate and 0.02 parts Lupersol 225 and the mixture is polymerized in the manner described in Example 1. The polymer is essentially similar to that described in Example 1 and is suitable as a contact lens material although the strength of the lens is not as great as that obtained in accordance with Example 8. Instead of the polyethylene glycol methacrylate esters used (as the second co-monomer) in Examples 13-15, I may use high polyethylene glycol esters (having a higher number of ethoxy groups per molecule).

As discussed above, the contact lens after being made is ordinarily saturated with normal saline or isotonic solution. In accordance with one embodiment of the invention, however, instead of using isotonic solution there may be used an aqueous solution or dispersion of an antibiotic which is saturated into the lens interstices and gradually released onto the surface of the eye as the lens is worn. After a predetermined number of hours, the lens may be resaturated with medicament for continued medication. Suitable medicaments which may be used include atropine, tiloscartine, eserine, Neodecatron (a propriety medication containing a mixture of the three drugs, dexamethasone, 21-phosphate and neomycine sulfate) or levo epinephirine.

There are many modifications and variations within the scope of the present invention and, accordingly, the invention should not be limited precisely to the foregoing examples. For instance, although the polymerization reactions described have been in anhydrous systems, it is possible to carry them out in the presence of some water. Other modifications will appear to those skilled in this field.

I claim:

1. A method of preparing a contact lens material comprises reacting under polymerizing conditions a monomer having the formula:

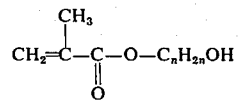

wherein $n$ is 2 or 3, in the substantial absence of monomers which have more than one unsaturated group and in the presence of a polymerization initiator or catalyst under conditions to effect polymerization of said monomeric material, the process being carried out at an initial polymerization temperature in the range of from 45° to 65° C. and thereafter post heating the resulting polymeric product for a period of time sufficient to effect completion of polymerization of any residual unpolymerized material and to effect relaxation of internal stresses in said polymer, and thereafter machining or cutting the polymer thus formed into contact lenses.

2. The method of claim 1 wherein the post heating step is conducted at a temperature in the range of from 90° C. to 110° C.

3. The method of claim 2 wherein the polymerization reaction is carried out employing polymerizable monomers consisting essentially of 100 parts by weight of a monomer having the formula:

(A) 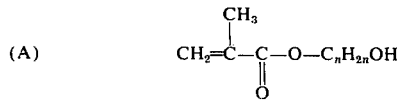

wherein $n$ is 2 or 3; and about 1 to about 15 parts by weight of a monomer having the formula:

(B) 

wherein R is hydrogen or methyl, and wherein R' is a lower alkyl group or the group ($C_2H_4O)_mH$ in which $m$ is 1 to 4, with the proviso that (A) and (B) represent different monomers.

4. The method of claim 2 wherein said monomer is hydroxyethyl methacrylate.

5. The method of claim 2 wherein said monomer is hydroxypropyl methacrylate.

6. The process of claim 2 wherein said polymer so cut and machined into contact lenses is washed with dilute aqueous alkali to neutralize any acid condition prevailing within the interstices of said polymer.

7. The method of claim 6 wherein subsequent to said neutralization, the lenses are heated in normal aqueous saline or isotonic solution.

8. The method of claim 3 wherein said polymer so cut and machined into contact lenses is washed with dilute aqueous alkali to neutralize any acid condition prevailing within the interstices of said polymer.

9. The method of claim 8 wherein subsequent to said neutralization, the lenses are heated in normal aqueous saline or isotonic solution.

10. A method for preparing contact lenses comprising reacting a monomer having the formula:

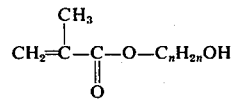

wherein $n$ is 2 or 3, in the substantial absence of monomers which have more than one unsaturated group, in the presence of 2 parts by weight of cellulose acetate per 90 parts by weight of said monomer and a polymerization initiator or catalyst, under conditions to effect polymerization of said monomeric material, machining or cutting the polymer thus formed into contact lenses and washing the contact lenses so formed with dilute aqueous alkali to neutralize any acid condition prevailing within the interstices of said polymer.

* * * * *